United States Patent
Yakich

[11] 3,864,758
[45] Feb. 11, 1975

[54] HIP JOINT BEARING PROSTHESIS
[76] Inventor: Sam Savo Yakich, 1266 E. St. Clair, Idaho Falls, Idaho 83401
[22] Filed: Aug. 31, 1973
[21] Appl. No.: 393,569

[52] U.S. Cl. .................... 3/1, 128/92 C, 128/92 CA
[51] Int. Cl. .............................................. A61f 1/24
[58] Field of Search .... 3/1; 128/92 C, 92 CA, 92 R, 128/92 D, 92 A, 92 BC

[56] References Cited
UNITED STATES PATENTS

| | | | |
|---|---|---|---|
| 2,251,209 | 7/1941 | Stader | 128/92 A |
| 3,102,536 | 9/1963 | Rose et al. | 128/92 CA |
| 3,269,758 | 8/1966 | Ulderup et al. | 128/92 C UX |
| 3,683,421 | 8/1972 | Martinie | 3/1 |

Primary Examiner—Ronald L. Frinks

[57] ABSTRACT

The Hip Joint Bearing and Prosthesis distributes leads evenly throughout the large supporting area by creation of the same and distributed pressure per cmsq regardless of a direction of the load. The lubricating fluid hermeticaly enclosed between double walls of spherical ball provides practicaly frictionless joint movement. No residues from body fluids are penetrating into microstructure of bearing surfaces to solidify and cause rough spots and increase tear and wear of the joint. Post-operative dislocations due to separation of ball and socket are practically eliminated.

Thick lubricating film and its elastic container have shock load absorption abilities.

The prosthesis allows length and rotational hip joint bearing adjustments during surgery to acheive its optimal position.

1 Claim, 4 Drawing Figures

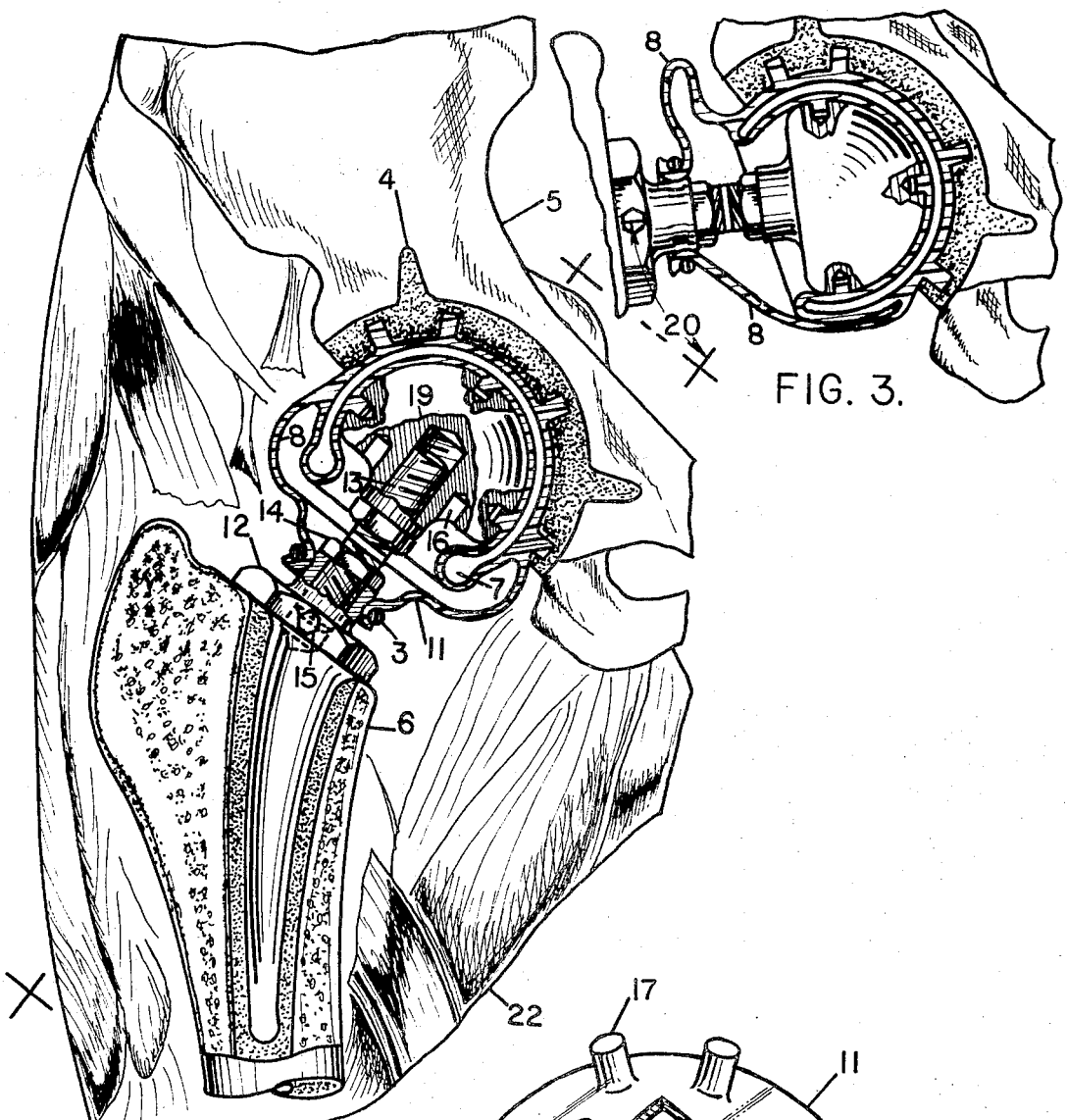
FIG. 3.
FIG. 1.
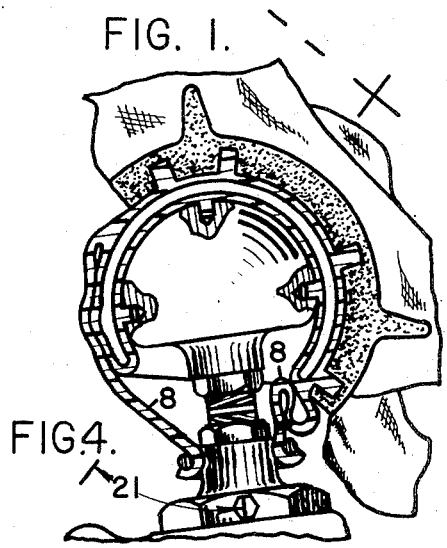
FIG. 4.
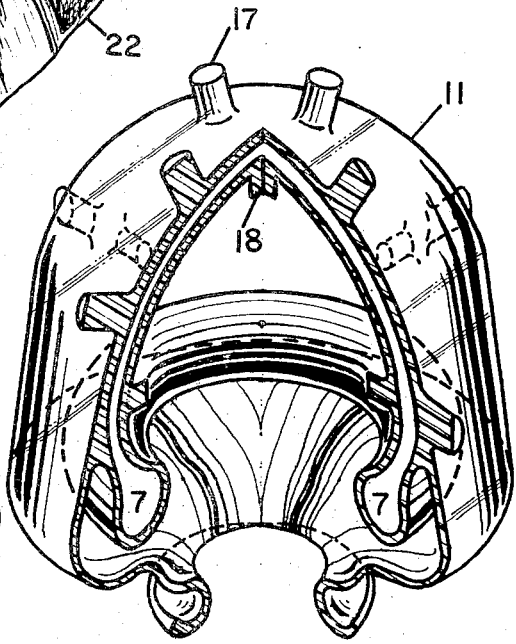
FIG. 2.

HIP JOINT BEARING PROSTHESIS

This invention relates to an artificial joint in general and more specifically to a human hip joint prosthesis.

Most of HJBP prior art suffer from the problem of load (pressure kg/cmsq) distribution over the spherical surface. This uneven load causes peak local pressures (kg/emsq) which are exceeding material stress limits of surfaces in contact and are coupled with additional problems such as:

a. Displacement of lubricating film from peak load areas and tearing of particles of metal which will precipitate the wear of the artificial joint.

b. Load force in prior art is concentrated at peak pressure spot and if its direction is unfavorable it will pry the joint socket from bonding cement loose, or even worst it may pry the socket and the cement from "Os Coxae" bone itself and make it loose.

c. Serious problem of previous HJPB art is that the joint is oped to the body fluids. The body fluids are not stable lubricants and they form rough sediment layers over polished joint surfaces. The anticipated lubrication by body fluids is not taking place, the lubricant that evaporates easy, sediments and adheres to the bearing surface in solid form, is poor lubricant and polished surfaces are are found to become rough very soon.

d. Prior art difficulties to lock joins ball in the socket, while the leg is moving, and prevent post operative joint dislocations has been partially solved. The solutions were: perfect fits (joint held by vacum or light interference fits). It is again believed that body fluid residues will soon disrupt this ideal condition of close fit between joint ball and socket.

e. Even later designs have made little attempt to aleviate serious problem of length and rotational leg and joint adjustments at the time of surgey operation. Again the length is of crucial importance: muscles of the thigh will hold the leg and the joint properly only if implanted prosthesis will tense the muscles to their natural level at time of surgery.

The present design has conceived the double wall hollow elastic ball 11, FIG. 1, with internal cavity 7, fully filled with permanently hermetically inclosed lubricating fluid, distilled water for instance, pure silicon oils etc.. As shown in FIG. 1 cavity 7 is completely separated from internal tissue.

Special double safety feature of the ball 11 is lower skirt 8 which separates internal position adjustments machanical parts from internal body tissue. The skirt 8 is fixed in its position by clamping ring 3 over an upper end of the femoral pin 12. The ball 11 is assembled with light interference fit over metal spherical socket ball 19.

The lips of cavity 7 have considerably smaller diameter than ball 11 and ball 19. Both above arrangements are greatly preventing a separation of ball 19 from inner part of ball 11. This feature will prevent greatly all post operative dislocations as it will be explained later in this text.

Elasticity of lips of cavity 7 will provide cushioning action to shock loads and as it will be described later the same lips will provide for an angular as well as for a complex displacements of the leg.

Degree of accomodation to the leg motion that plasto-elastic ball 11 provides is closest to natural leg motion in comparison to all up to now known design attempts.

In the present design care has been also taken to help the orthopedic surgeon to position the HJBP lengthwise and rotationwise mechanically with left and right hand threaded stud 13 and two self-locking nuts 14.

In comparison with some earlier designs this design eliminates:

Need for ultra-precision machining and super polishing of ball surfacees.

Some commonlly used materials and techniques by which this invention is supported will be generally and briefly described.

Metal parts shall be fabricated from chrome-Cobalt-Molybdenum alloys and other similar compounds. Standard BS-3531 from 1968 gives all detailed technological and medical limits for metals to qualify for HJBP fabrication. Shear, compressive and tensile yield stress limits of these metals are 10–15 times higher, at all critical sections, than any maximum possibly applied stresses by a patient.

Present technological advances in the area of plastic materials give arrays of choices to mold a double wall hollow ball 11 in most optimal configuration. One posible elastic material that shall pass cyclic load tests is silicone rubber or polyethylene.

The above (mentioned in discusion) advantages will be more elaborated in the following description:

FIG. 1. illustrates meridional (parallel to body frontal plane) section through the HJPB area of a left leg. Femoral bone 6 is shown in normal vertical undisplaced position.

FIG. 2. illustrates isometric view of the hollow ball 11 of the HJPB invention. One quadrant of the ball 11 is cut out to show more clearly the shape of this important part.

FIG. 3 illustrates the HJPB displaced for an angle 20 (approx. 45°) upward from HJPB position shown in FIG. 1.

FIG. 4. illustrates the HJPB displaced down for an angle 21 (approx. 45°) from HJPB shown in FIG. 1. Motion of the HJPB in all other planes than shown is similar and needs no additional explanation. Longer skirts 7 and 8 will accommodate larger angles.

Refering to FIG. 1 the proposed HJPB consists of:

The metal pin 12, metal left and right hand threaded stud 13, metal spherical ball 19, two metal self-locking left and right hand threaded nuts 14, elastic double wall hollow ball 11 elastic metal securing clamping ring 3.

All above mentioned parts are fabricated from biomedically inert materials.

The pin 12 has form as shown in FIG. 1., its end collar is made in form of hexagonal nut to help hold the pin 12 and femoral bone 6 for tightening of nuts 14 in final position. On its sides pin 12 has two hexagonal holes 15 to ease extraction of pin 12. On its top pin 12 has one left hand threaded hole to accept bottom end of stud 13. The spherical ball 19 has on its bottom a right hand threaded hole to accept top end of stud 13.

The stud 13 has assembled on itself one right and one left hand nut. the stud 13 is used to adjust the length and rotational relative position between ball 11 and pin 12 i.e. between: "Os Coxae" and femoral bone.

The nuts 14 are initially brought to the center of stud 13. With open end hexagonal wrench the stud 13 is turned until desired length and rotational position is acheived.

During this operation skirt 8 is pushed upward, to allow tightening of upper nut 14. Ball 19 is held by special wrench with two pins engaged in holes 16, while upper nut 14 is torqued. Finally lower nut 14 is torqued while pin 12 is held over its hex. nut. When this final position is secured clamping ring 3 is forced over lower lip of skirt 8 to hold it permanently over premachined groove of pin 12.

There are number of combinations in which HJPB is placed. Above description of method to adjust the HJPB is one of the combinations. The order in which during the operation HJPB is placed will in general be decided by operating surgeon.

The ball 19 has over its spherical surface a minimum of five blind holes to accept internal ball pins 18, this is made to prevent any possible sliding between inner wall of ball 11 and spherical ball 19.

During fabrication inner diameter of ball 11 is made smaller than outer diameter of sphere 19. Prior to HJPB implant the spherical ball 19 is snap fitted in the hollow ball 11. As mentioned before this feature is large improvement designed to prevent post operative dislocations.

It is now important to describe movements of the inner wall of the ball 11 and of the lips of the cavity 7 while the leg is moved out of the position shown in FIG. 1.

First, body weight applies pressure to lubricating fluid inside spherical plus toroidal hermetically sealed and filled with lubricating fluid cavity 7 (shown not crosshatced in FIG. 1. through 4.).

Since lubricating fluid is incompressible, inner walls of elastic cavity 7 deform slightly, but never will touch each other, and thus provide smooth and frictionless joint motion and damping of shock loads.

However, when besides vertical body load the angular leg position is changed, free to move and bend skirt cavity lips 7, FIG. 2., are changing position and shape to accomodate for relative sliding between inner and outer walls of ball 11. FIGS. 3 and 4. are showing shapes of outer skirts 8 and inner lips 7— FIG. 2., and their respective positions when HJPB is at extreme upper and lower positions.

Pins 17 are located at outer wall surface of hollow ball 11, in the cement 4, anchored in the "Os Coxae" bone 5.

Muscles of the thigh 22 (besides other natural functions) are anchored upon knee and "Os Coxae" bones and by their natural tension hold the HJPB in position as shown in FIG. 1..

I claim:

1. A joint prosthesis for use in a human bone joint such as the acetabulum or the like comprising, a one-piece hollow double wall spherical ball member defined by an inner wall hermetically sealed to an outer wall, said inner and outer walls being spaced from each other to form cavity therebetween which includes a lubricating fluid therein, said walls terminating in a lower terminal first annular skirt which is surrounded by a second elongated annular skirt, said second skirt adapted to to be attached to a portion of another prosthetic joint member to effect a seal therewith to prevent contact with body fluids and tissue, said hollow ball and annular skirts being fabricated from biomedically inert elastic material and being provided with means to attach the joint prosthesis to a human bone joint.

* * * * *

UNITED STATES PATENT OFFICE
CERTIFICATE OF CORRECTION

Patent No. 3,864,758  Dated February 11, 1975

Inventor(s) Sam Savo Yakich

It is certified that error appears in the above-identified patent and that said Letters Patent are hereby corrected as shown below:

Abstract, line 1, "distributes leads" should read -- distributes loads --. Column 1, line 8, "(kg/emsq)" should read -- (kg/cmsq) --.

Signed and sealed this 24th day of June 1975.

(SEAL)
Attest:

RUTH C. MASON
Attesting Officer

C. MARSHALL DANN
Commissioner of Patents
and Trademarks